(12) United States Patent
Deng

(10) Patent No.: US 10,111,442 B2
(45) Date of Patent: Oct. 30, 2018

(54) DOUGH MIXER

(71) Applicant: Housoen Electric Manufacture Co., Ltd., Jiangmen, Guangdong Province (CN)

(72) Inventor: Yao Tian Deng, Jiangmen (CN)

(73) Assignee: Housoen Electric Manufacture Co., Ltd., Jiangmen, Guangdong Province (CN)

( * ) Notice: Subject to any disclaimer, the term of this patent is extended or adjusted under 35 U.S.C. 154(b) by 185 days.

(21) Appl. No.: 15/358,472

(22) Filed: Nov. 22, 2016

(65) Prior Publication Data
US 2018/0055060 A1    Mar. 1, 2018

(30) Foreign Application Priority Data

Aug. 29, 2016   (CN) .......................... 2016 1 0756198

(51) Int. Cl.
| *A21C 1/14* | (2006.01) |
| *B01F 7/00* | (2006.01) |
| *B01F 7/30* | (2006.01) |
| *B01F 15/00* | (2006.01) |
| *A21C 1/02* | (2006.01) |

(52) U.S. Cl.
CPC .............. *A21C 1/1405* (2013.01); *A21C 1/02* (2013.01); *A21C 1/1485* (2013.01); *B01F 7/00033* (2013.01); *B01F 7/00208* (2013.01); *B01F 7/00275* (2013.01); *B01F 7/00325* (2013.01); *B01F 7/00583* (2013.01); *B01F 7/00633* (2013.01); *B01F 7/30* (2013.01); *B01F 15/00058* (2013.01); *A21C 1/147* (2013.01); *B01F 2215/0011* (2013.01)

(58) Field of Classification Search
CPC ....... A21C 1/1405; A21C 1/02; A21C 1/1485; A21C 1/147; B01F 7/00325; B01F 7/00275; B01F 7/00583; B01F 7/00033; B01F 7/00208; B01F 15/00058; B01F 7/00633; B01F 7/30; B01F 2215/0011
USPC .......................... 366/309, 310, 311, 312, 313
See application file for complete search history.

(56) References Cited

U.S. PATENT DOCUMENTS

| 502,066 A * | 7/1893 | Bull ........................ A01J 15/06 366/283 |
| 531,824 A * | 1/1895 | Anderson ................ A23G 9/12 366/149 |

(Continued)

*Primary Examiner* — Tony G Soohoo
(74) *Attorney, Agent, or Firm* — Young Basile Hanlon & MacFarlane, P.C.

(57) ABSTRACT

A dough mixer includes a main unit with a motor arranged therein and a dough mixing assembly mounted thereon. The dough mixing assembly includes a dough mixing bowl, a top cover, a transmission shaft connected to the motor and is arranged in the dough mixing bowl, a dough mixing unit connected to the transmission shaft and including an upper end, and a scraper unit detachably connected to the upper end of the dough mixing unit. The scraper unit includes a first bowl wall scraper including a first blade fitted to an inner wall of the dough mixing bowl, a second bowl wall scraper including a second blade fitted to the inner wall of the dough mixing bowl, wherein the second bowl wall scraper is arranged opposite to the first bowl wall scraper, and a central scraper including a third blade matched with an outer wall of the transmission shaft.

10 Claims, 7 Drawing Sheets

(56) References Cited

U.S. PATENT DOCUMENTS

| | | | | |
|---|---|---|---|---|
| 969,016 | A * | 8/1910 | Willmann | B01F 7/00208 366/311 |
| 1,200,250 | A * | 10/1916 | Sinding-Larsen | B01F 7/00208 366/311 |
| 1,345,542 | A * | 7/1920 | Hartshorn | B01F 7/00058 366/311 |
| 1,415,735 | A * | 5/1922 | Trust | B01F 7/1605 366/288 |
| 1,612,281 | A * | 12/1926 | Goetz | A47J 43/1025 366/244 |
| 1,714,750 | A * | 5/1929 | Aeschbach | A21C 1/02 366/97 |
| 2,015,397 | A * | 9/1935 | Eppler | A21C 1/00 366/309 |
| 2,831,418 | A * | 4/1958 | Ponisch | A23G 1/125 165/109.1 |
| 3,169,395 | A * | 2/1965 | Enoch | G01N 11/10 366/287 |
| 3,169,493 | A * | 2/1965 | Enoch | A21C 1/02 366/70 |
| 3,188,677 | A * | 6/1965 | Jamison, Jr. | B08B 1/04 122/380 |
| 3,671,296 | A * | 6/1972 | Funakoshie et al. | A61J 3/005 118/500 |
| 3,920,228 | A * | 11/1975 | Klauk | A47J 27/14 366/313 |
| 4,079,917 | A * | 3/1978 | Popeil | A47J 43/082 366/244 |
| 4,190,371 | A * | 2/1980 | Durr | B01F 7/00208 366/139 |
| 4,337,000 | A * | 6/1982 | Lehmann | A21C 1/1405 366/288 |
| 4,552,461 | A * | 11/1985 | Ott | B01F 7/0025 366/194 |
| 4,786,184 | A * | 11/1988 | Berezkina | B01F 7/30 366/288 |
| 4,887,910 | A * | 12/1989 | Bravo | A23G 9/224 366/205 |
| 4,946,285 | A * | 8/1990 | Vennemeyer | A47J 43/0711 366/288 |
| 5,302,020 | A * | 4/1994 | Kruse | B01F 7/305 366/288 |
| 5,556,201 | A * | 9/1996 | Veltrop | B01F 7/00208 366/203 |
| 6,863,432 | B2 * | 3/2005 | Schuchardt | B01F 7/00166 366/299 |
| 9,737,079 | B2 * | 8/2017 | Wang | A21C 1/1405 |
| 2001/0019515 | A1 * | 9/2001 | Schmidt | B01F 7/00208 366/310 |
| 2003/0072209 | A1 * | 4/2003 | Galletti | B01F 7/00025 366/64 |
| 2004/0240313 | A1 * | 12/2004 | Fallowes | A47J 43/0711 366/162.5 |
| 2007/0036028 | A1 * | 2/2007 | Yoshioka | B01F 7/001 366/312 |
| 2007/0140053 | A1 * | 6/2007 | Jejcic | A23G 9/224 366/311 |
| 2012/0155215 | A1 * | 6/2012 | Verma | B01F 7/1695 366/199 |
| 2013/0033958 | A1 * | 2/2013 | Bravo | B01F 7/00208 366/272 |
| 2014/0219045 | A1 * | 8/2014 | Cheung | A47J 43/085 366/97 |
| 2015/0230480 | A1 * | 8/2015 | Wang | A21C 1/1405 366/97 |
| 2016/0256839 | A1 * | 9/2016 | Dickson, Jr. | B01F 15/00305 |
| 2017/0042179 | A1 * | 2/2017 | Thomas | A23G 9/12 |
| 2017/0112145 | A1 * | 4/2017 | Deng | A21C 1/02 |
| 2017/0156349 | A1 * | 6/2017 | Jahge | A47J 43/07 |
| 2018/0055060 | A1 * | 3/2018 | Deng | A21C 1/02 |
| 2018/0055061 | A1 * | 3/2018 | Deng | A21C 1/02 |

* cited by examiner

DOUGH MIXER

CROSS-REFERENCE TO RELATED APPLICATION

This application claims priority to and the benefit of Chinese Patent Application Serial No. 201610756198.5, filed on Aug. 29, 2016, the entire disclosure of which is hereby incorporated by reference.

TECHNICAL FIELD

This disclosure relates to a dough mixer.

BACKGROUND

A dough mixer is a supporting equipment for noodle processing. When the dough mixer is in use, dry flour is poured into a dough mixing bowl of the dough mixer first, an appropriate amount of water is then poured into the dry flour, a rotary shaft on a dough mixing mechanism then drives a dough mixing unit to rotate, and after mixing the dry flour and the water into dough, the dough mixing unit mixes the dough. While mixing dough, users usually further add eggs to make bread. However, in the process of mixing dough, part of the dough can be easily stuck on the inner wall of the dough mixing bowl and the transmission shaft, this part of dough is not mixed sufficiently, as a result, waste is caused. Furthermore, cleaning of the dough mixer by a user is affected, and inconvenience is brought to users.

SUMMARY

In order to overcome the defects of the prior art, the present disclosure provides a dough mixer, which is provided with a scraper unit capable of scraping off dough stuck on the inner wall of a dough mixing bowl and a transmission shaft in time, so that waste can be prevented and cleaning can be convenient after use.

The technical solution which is adopted by the present disclosure to solve the technical problem is as follows:

A dough mixer, which comprises a main unit and a dough mixing assembly mounted on the main unit, a motor is arranged in the main unit, the dough mixing assembly comprises a dough mixing bowl and a top cover, a transmission shaft which is connected to the motor is arranged in the dough mixing bowl, the transmission shaft is connected to a dough mixing unit, the upper end of the dough mixing unit is further connected to a detachable scraper unit, the scraper unit is provided with two oppositely arranged bowl wall scrapers for scraping off adhering material on the inner wall of the dough mixing bowl and a central scraper for scraping off adhering material on the outer wall of the transmission shaft, the bowl wall scraper is provided with a blade fitted to the inner wall of the dough mixing bowl, the central scraper is provided with a blade which is matched with the shape of the outer wall of the transmission shaft.

As an improvement of the technical solution, the bowl wall scrapers and the central scraper are made of silica gel material.

As a further improvement of the technical solution, the scraper unit comprises a holder which is mounted on the dough mixing unit, the central scraper is fixedly connected to the outer wall of the holder, the holder is provided with a supporting arm on each of both sides of the holder, for the mounting of the bowl wall scraper.

As a further improvement, the supporting arms are fixedly connected to the holder through screws.

As a further improvement, the holder and the supporting arms are respectively provided with a mounting sleeve on the outer wall of the holder and at the end of each supporting arm, and the bowl wall scrapers and the central scraper are respectively provided with an elastic fastener which is matched with the mounting sleeve.

As a further improvement, the holder is shaped like a bowl and fastened on the dough mixing unit, the holder is further provided with a fastener for fastening the dough mixing unit.

As a further improvement, the dough mixing unit comprises a bidirectional dough mixing hook and a double-headed eggbeater.

As a further improvement, the double-headed eggbeater comprises a mount which is connected to the transmission shaft, rotatable egg beating nets are connected to both sides of the mount, a bevel gear is arranged on the mount, and small gears which are engaged with the bevel gear are arranged on the egg beating nets.

As a further improvement, the top cover is provided at the lower end thereof with a vertical coaming fitted to the inner wall of the dough mixing bowl, the vertical coaming is provided with fastening grooves, and the dough mixing bowl is provided at the inner wall thereof with fastening blocks which are matched with the fastening grooves.

As a further improvement, the top cover is also provided at the center thereof with a detachable internal cover.

The present disclosure has the following beneficial technical effects: the scraper unit is mounted at the upper end of the dough mixing unit and it can follow the dough mixing unit to rotate, adhering material on the inner wall of the dough mixing bowl can be scraped off by the bowl wall scrapers, adhering material on the outer wall of the transmission shaft can be scraped off by the central scraper, consequently, the usage rate of flour is increased, waste is prevented, moreover, the inner wall of the dough mixing bowl and the outer wall of the transmission shaft can be cleaned conveniently after use, and convenience is brought to users. The present disclosure is reasonable and practical in structure, easy to implement, and having a good scraping effect.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
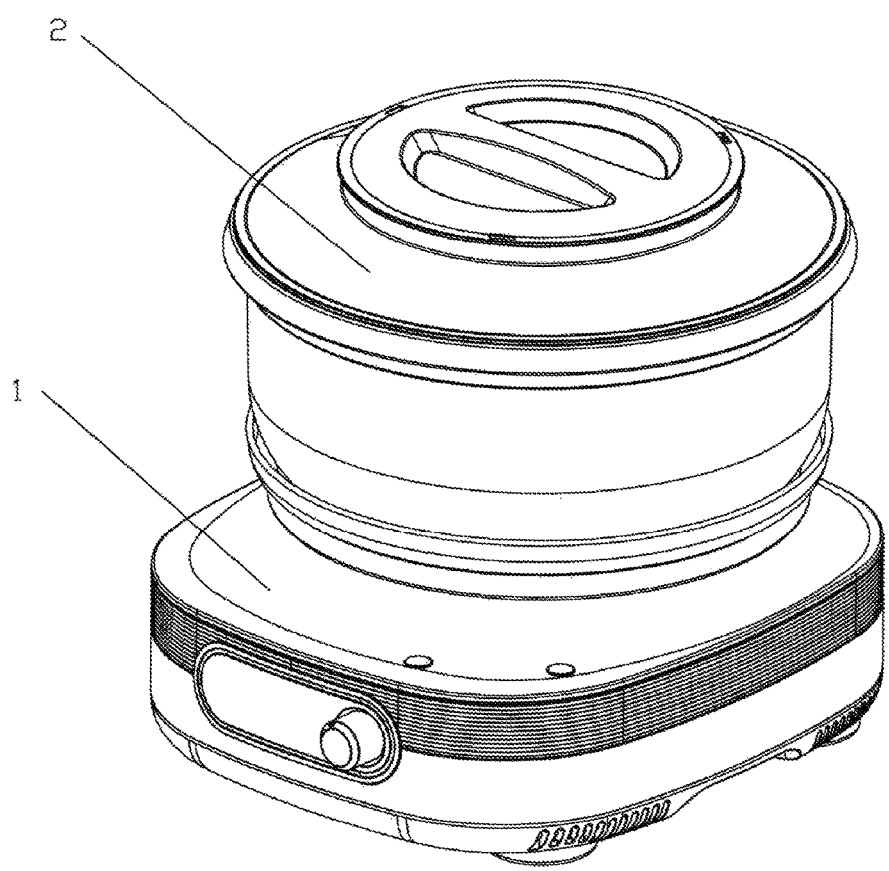
FIG. 1 is a perspective view of a dough mixer according to implementations of the present disclosure.
Figure 2:
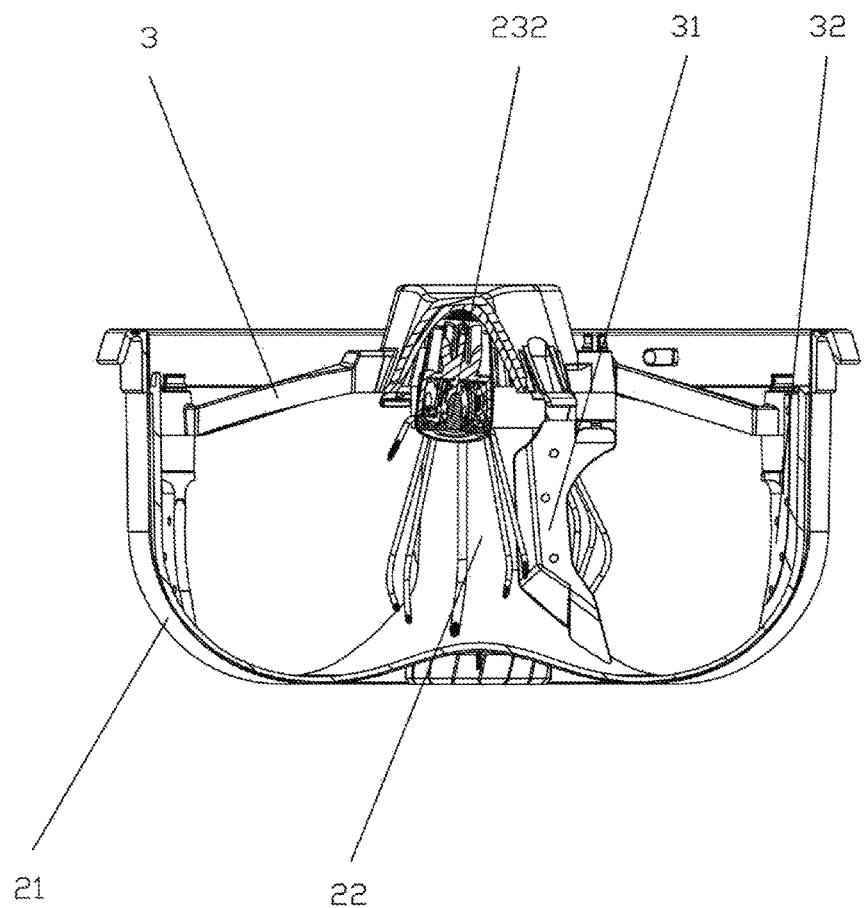
FIG. 2 is a side view of a dough mixing assembly according to implementations of the present disclosure.
Figure 3:
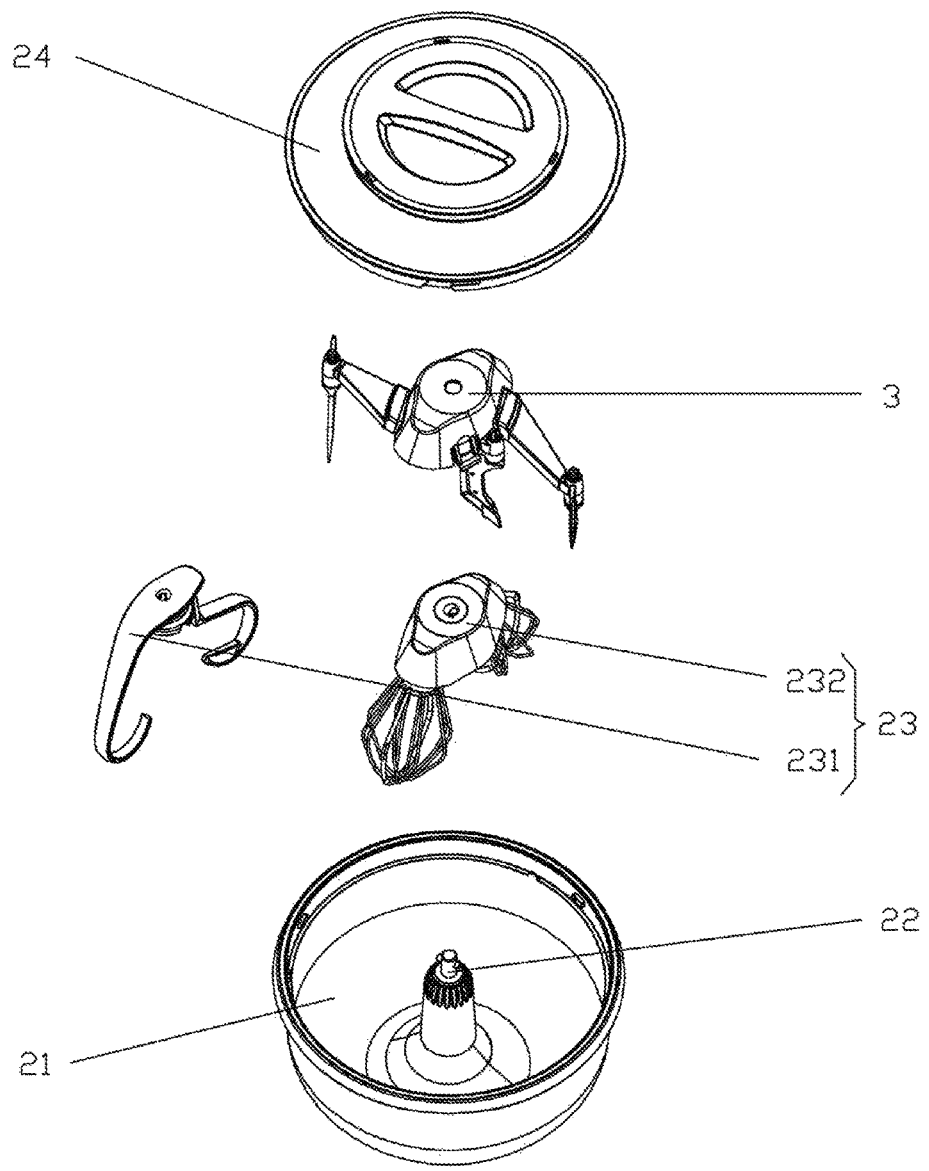
FIG. 3 is an exploded view of the dough mixing assembly in FIG. 2 according to implementations of the present disclosure.
Figure 4:
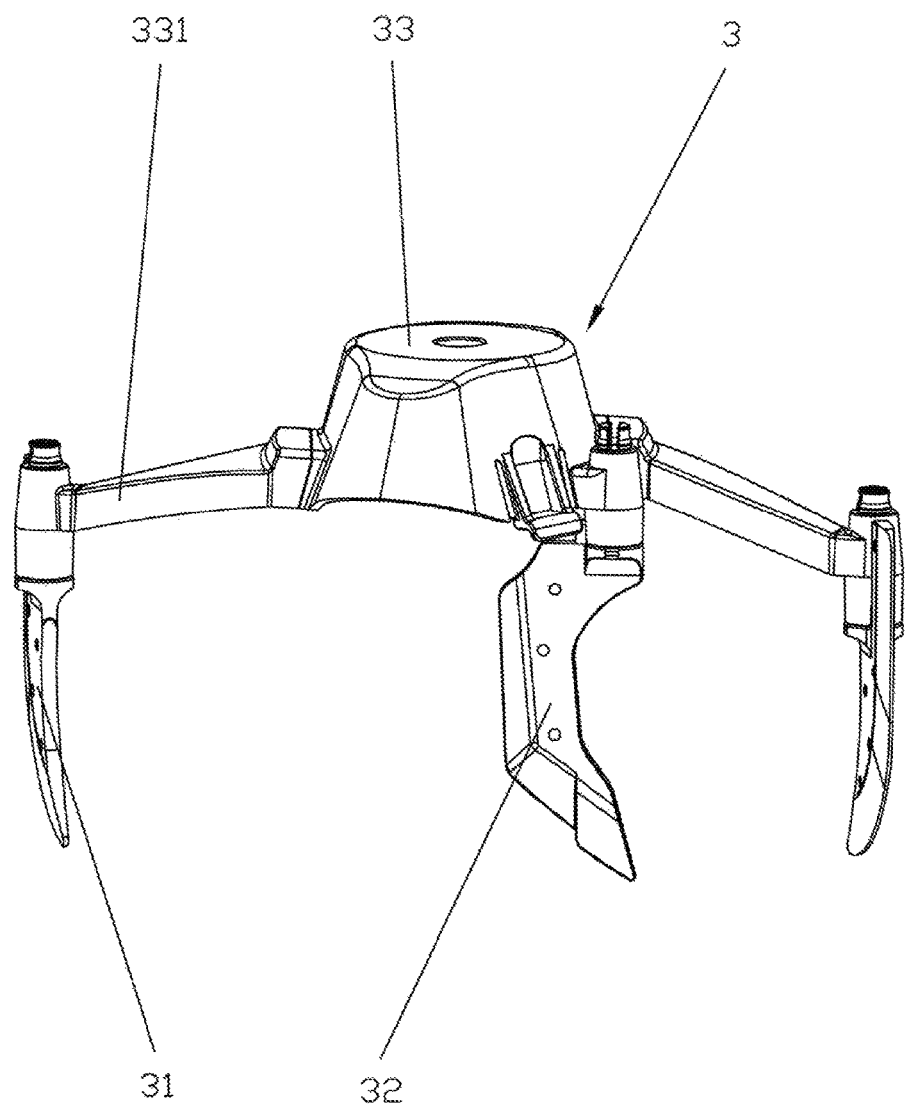
FIG. 4 is a perspective view of a scraper unit according to implementations of the present disclosure.
Figure 5:
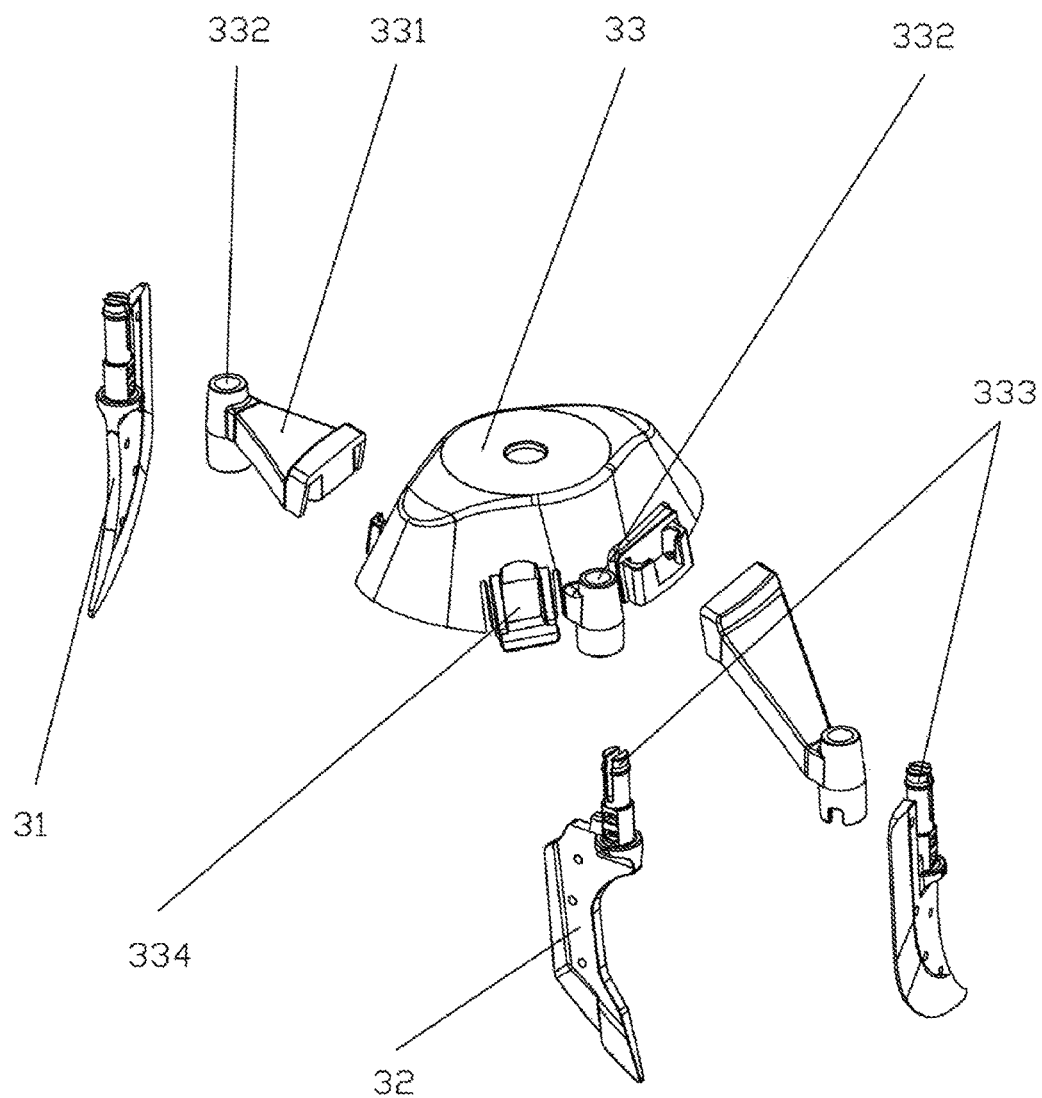
FIG. 5 is an exploded view of the scraper unit in FIG. 4 according to implementations of the present disclosure.
Figure 6:
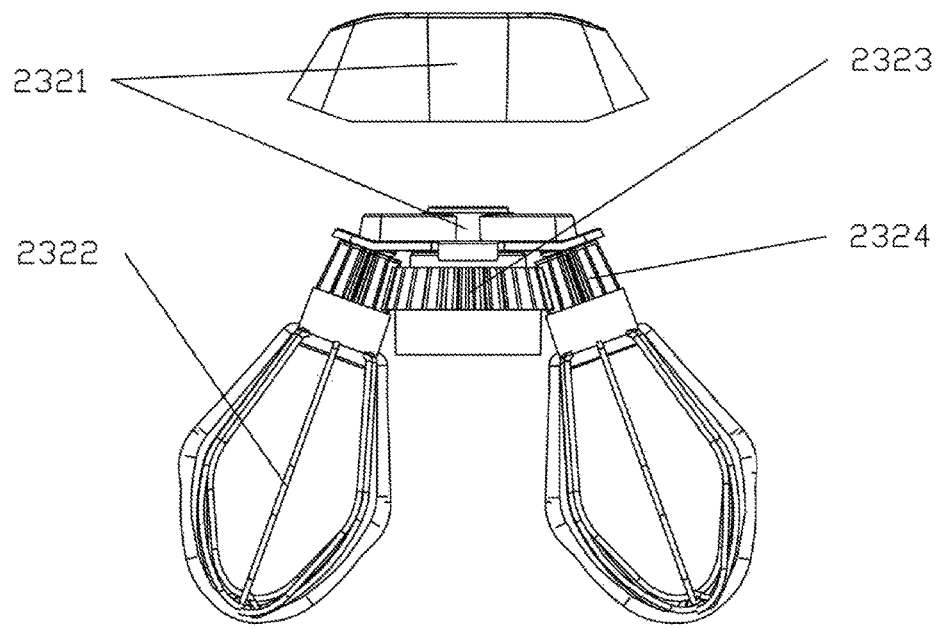
FIG. 6 is a side view of a double-headed eggbeater according to implementations of the present disclosure.
Figure 7:
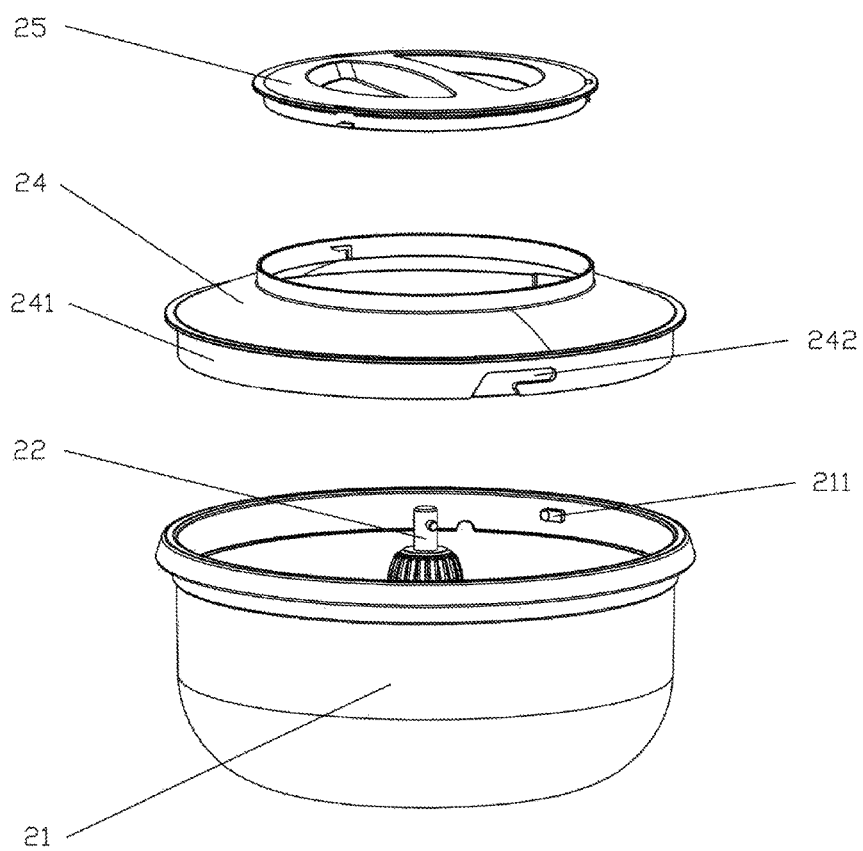
FIG. 7 is an exploded view of a dough mixing bowl and a top cover according to implementations of the present disclosure.

Referring to FIGS. 1-7, a dough mixer is shown, which comprises a main unit 1 and a dough mixing assembly 2 mounted on the main unit 1, a motor is arranged in the main unit 1, the dough mixing assembly 2 comprises a dough mixing bowl 21 and a top cover 24, a transmission shaft 22 which is connected to the motor is arranged in the dough mixing bowl 21, the transmission shaft 22 is connected to a dough mixing unit 23, the upper end of the dough mixing unit 23 is further connected to a detachable scraper unit 3, the scraper unit 3 is provided with two oppositely arranged bowl wall scrapers 31 for scraping off adhering material on the inner wall of the dough mixing bowl 21 and a central scraper 32 for scraping off adhering material on the outer wall of the transmission shaft 22, the bowl wall scraper 31 is provided with a blade fitted to the inner wall of the dough mixing bowl 21, the central scraper 32 is provided with a blade which is matched with the shape of the outer wall of the transmission shaft 22. Preferably, the bowl wall scrapers 31 and the central scraper 32 are made of silica gel material. The elasticity of the silica gel material is utilized to make the blades of the bowl wall scrapers 31 and the central scraper 32 to be fitted to the inner wall of the dough mixing bowl 21 and the outer wall of the transmission shaft 22. The scraper unit 3 is mounted at the upper end of the dough mixing unit 23 and it can follow the dough mixing unit 23 to rotate, so that the bowl wall scrapers 31 and the central scraper 32 can scrape off dough stuck on the inner wall of the dough mixing bowl 21 and the outer wall of the transmission shaft 22, the scraped dough drops into the dough mixing bowl 21 and is mixed with a big dough, consequently, waste is prevented, and the usage rate of flour is increased; in addition, after use, the inner wall of the dough mixing bowl 21 and the outer wall of the transmission shaft 22 are relatively clean, therefore, cleaning can be convenient, and the convenience is brought to users.

In the implementation, preferably, the scraper unit 3 comprises a holder 33 which is mounted on the dough mixing unit 23, the central scraper 32 is fixedly connected to the outer wall of the holder 33, the holder 33 is provided with a supporting arm 331 on each of both sides of the holder, for the mounting of the bowl wall scraper 31. Preferably, the supporting arms 331 are fixedly connected to the holder 33 through screws. Preferably, the holder 33 and the supporting arms 331 are respectively provided with a mounting sleeve 332 on the outer wall of the holder 33 and at the end of each supporting arms 331, the bowl wall scrapers 31 and the central scraper 32 are respectively provided with an elastic fastener 333 which is matched with the mounting sleeve 332. Preferably, the holder 33 is shaped like a bowl and fastened on the dough mixing unit 23, the holder 33 is further provided with a fastener 334 for fastening the dough mixing unit 23. By adopting the structure, different specifications of supporting arms 331 and bowl wall scrapers 31 can be used for different sizes of dough mixing bowls 21, with universal performance, the bowl wall scrapers 31 and the central scraper 32 can be mounted on the mounting sleeves 332 through the elastic fasteners 333, the structure is simple and convenient to disassemble, assemble and maintain; since the bowl-shaped holder 33 is fastened on the dough mixing unit 23 and locked by the fasteners 334, a firm and reliable connection between the scraper unit 3 and the dough mixing unit 23 is ensured in the process of mixing dough, and moreover, the scraper unit 3 is convenient to dismount and clean.

In the implementation, preferably, the dough mixing unit 23 comprises a bidirectional dough mixing hook 231 and a double-headed eggbeater 232 for users to choose, so that users can conveniently mix dough or beat egg milk foam or make mashed potato, jam, etc., so the dough mixer has a variety of functions and it's more convenient to use.

In the implementation, preferably, the double-headed eggbeater 232 comprises a mount 2321 which is connected to the transmission shaft 22, rotatable egg beating nets 2322 are connected to both sides of the mount 2321, a bevel gear 2323 is arranged on the mount 2321, and small gears 2324 which are engaged with the bevel gear 2323 are arranged on the egg beating nets 2322. By adopting the structure, the mount 2321 is driven by the transmission shaft 22 to rotate, the egg beating nets 2322 are then driven to rotate through the engagement between the bevel gear 2323 and the small gears 2324, the double-headed eggbeater 232 rotates and revolves simultaneously, and thereby the processing efficiency is increased greatly.

In the implementation, preferably, the top cover 24 is provided at the lower end thereof with a vertical coaming 241 fitted to the inner wall of the dough mixing bowl 21, the vertical coaming 241 is provided with fastening grooves 242, and the dough mixing bowl 21 is provided at the inner wall thereof with fastening blocks 211 which are matched with the fastening grooves 242. The mating between the fastening grooves 242 and the fastening blocks 211 ensures that the top cover 24 can be firmly connected to the dough mixing bowl 21, for preventing separation, and thereby dough is prevented from flying out of the dough mixing bowl 21 in the process of mixing the dough.

In the implementation, preferably, the top cover 24 is further provided at the center thereof with a detachable internal cover 25. Supplementary materials for food can be added through a hole in the center of the top cover 24 by removing the internal cover 25, and thereby preferably, the problem that operation is inconvenient because the feed inlet of the dough mixer is too small, is solved.

What is mentioned above is merely the preferred implementations of the present disclosure, however, the present disclosure is not limited to the above-mentioned implementations, and all implementations which achieve the technical effects of the present disclosure with any same or similar means should fall within the protection scope of the present disclosure.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. A dough mixer, comprising:
a main unit, wherein a motor is arranged in the main unit; and
a dough mixing assembly mounted on the main unit, comprising:
a dough mixing bowl;
a top cover;

a transmission shaft connected to the motor, wherein the transmission shaft is arranged in the dough mixing bowl;

a dough mixing unit connected to the transmission shaft and comprising an upper end; and a scraper unit detachably connected to the upper end of the dough mixing unit, comprising:

a first bowl wall scraper, comprising a first blade fitted to an inner wall of the dough mixing bowl;

a second bowl wall scraper, comprising a second blade fitted to the inner wall of the dough mixing bowl, wherein the second bowl wall scraper is arranged opposite to the first bowl wall scraper; and a central scraper, comprising a third blade matched with an outer wall of the transmission shaft, wherein the first and second bowl wall scrapers and the central scraper are configured to scrap off adhering material on the dough mixing assembly.

2. The dough mixer of claim 1, wherein the first bowl wall scraper, the second bowl wall scraper, and the central scraper are made of a silica gel material.

3. The dough mixer of claim 2, wherein the scraper unit comprises:

a holder mounted on the dough mixing unit, wherein the central scraper is fixedly connected to an outer wall of the holder;

a first supporting arm on a first side of the holder; and a second supporting arm on a second side of the holder.

4. The dough mixer of claim 3, wherein the first supporting arm and the second supporting arm are fixedly connected to the holder through screws.

5. The dough mixer of claim 4, wherein the first supporting arm comprises a first mounting sleeve at a first end, the first bowl wall scraper comprising a first elastic fastener to be matched with the first mounting sleeve, the second supporting arm comprises a second mounting sleeve at a second end, the second bowl wall scraper comprising a second elastic fastener to be matched with the second mounting sleeve, and the holder comprises a third mounting sleeve on the outer wall of the holder, the central scraper comprising a third elastic fastener to be matched with the third mounting sleeve.

6. The dough mixer of claim 5, wherein the holder comprises a fastener for fastening the dough mixing unit and the holder is of a bowl shape and fastened on the dough mixing unit.

7. The dough mixer of claim 1, wherein the dough mixing unit comprises a bidirectional dough mixing hook and a double-headed eggbeater.

8. The dough mixer of claim 7, wherein the double-headed eggbeater comprises:

a mount connected to the transmission shaft;

a first egg beating net connected to a third side of the mount;

a second egg beating net connected to a fourth side of the mount;

a bevel gear arranged on the mount; and gears engaged with the bevel gear, wherein the gears are arranged on the first egg beating net and the second egg beating net.

9. The dough mixer of claim 1, wherein the top cover comprises a vertical coaming at a lower end of the top cover, the vertical coaming comprises fastening grooves and is fitted to the inner wall of the dough mixing bowl, and the dough mixing bowl comprises fastening blocks on the inner wall of the dough mixing bowl to be matched with the fastening grooves.

10. The dough mixer of claim 9, wherein the top cover comprises a detachable internal cover at a center of the top cover.

* * * * *